(12) United States Patent
Cachod (10) Patent No.: US 8,702,107 B2
(45) Date of Patent: Apr. 22, 2014

(54) TOOL-HOLDER MANDREL FOR FITTING TO A ROTATING MACHINE

(75) Inventor: Yves Cachod, Levier (FR)

(73) Assignee: Etablissements Amyot S.A., Pontarlier (FR)

( * ) Notice: Subject to any disclaimer, the term of this patent is extended or adjusted under 35 U.S.C. 154(b) by 1014 days.

(21) Appl. No.: 12/677,422

(22) PCT Filed: Jan. 19, 2010

(86) PCT No.: PCT/FR2010/050073
§ 371 (c)(1),
(2), (4) Date: May 13, 2010

(87) PCT Pub. No.: WO2010/084278
PCT Pub. Date: Jul. 29, 2010

(65) Prior Publication Data
US 2011/0215537 A1   Sep. 8, 2011

(30) Foreign Application Priority Data
Jan. 26, 2009 (FR) ...................................... 09 50441

(51) Int. Cl.
*B23B 31/16* (2006.01)
(52) U.S. Cl.
USPC .............................. 279/63; 279/140; 279/902
(58) Field of Classification Search
USPC ..................................... 279/60–65, 140, 902
IPC ....................................................... B23B 31/16
See application file for complete search history.

(56) References Cited

U.S. PATENT DOCUMENTS

| | | | | |
|---|---|---|---|---|
| 1,188,532 A | * | 6/1916 | Cobey | 279/63 |
| 1,188,533 A | * | 6/1916 | Cobey | 279/63 |
| 1,203,178 A | * | 10/1916 | Bowers | 279/63 |
| 1,304,658 A | * | 5/1919 | Cobey | 279/63 |
| 1,364,361 A | * | 1/1921 | Emrick | 279/63 |
| 1,668,317 A | * | 5/1928 | Hubbell | 279/63 |
| 1,885,790 A | * | 11/1932 | Amyot | 279/63 |
| 2,075,031 A | * | 3/1937 | Emrick | 279/63 |
| 3,237,955 A | * | 3/1966 | Haviland et al. | 279/63 |
| 3,506,277 A | * | 4/1970 | Harms | 279/63 |

(Continued)

FOREIGN PATENT DOCUMENTS

| | | |
|---|---|---|
| DE | 16 497 C | 5/1881 |
| EP | 0 331 867 A2 | 9/1989 |

(Continued)

OTHER PUBLICATIONS

International Search Report in International Application No. PCT/FR2010/050073; dated Aug. 10, 2011 (with English-language translation).

*Primary Examiner* — Eric A Gates
(74) *Attorney, Agent, or Firm* — Oliff PLC (57) ABSTRACT

The invention relates to a tool-holder mandrel for fitting to a rotating machine, comprising:
  a body comprising a rear portion designed to be attached to a drive shaft of the rotating machine and a front portion in which housing are arranged converging toward the front;
  jaws mounted so as to slide each in a housing of the body and having an inner thread;
  a ring for moving the jaws, mounted so as to pivot relative to the body, having a peripheral thread interacting with the inner thread of the jaws so that the rotation of the ring closes or opens the jaws.

10 Claims, 5 Drawing Sheets

(56) References Cited

U.S. PATENT DOCUMENTS

| | | |
|---|---|---|
| 4,991,860 A | 2/1991 | Rohm |
| 5,054,796 A * | 10/1991 | Rohm .................. 279/60 |
| 5,236,206 A * | 8/1993 | Rohm .................. 279/63 |
| 6,260,857 B1 | 7/2001 | Wienhold et al. |
| 6,488,287 B2 * | 12/2002 | Gaddis et al. .......... 279/63 |
| 7,556,269 B2 * | 7/2009 | Cachod ................. 279/63 |

FOREIGN PATENT DOCUMENTS

| | | |
|---|---|---|
| EP | 1 314 499 A1 | 5/2003 |
| FR | 2 883 208 A | 9/2006 |
| GB | 2 429 667 A | 3/2007 |

* cited by examiner

TOOL-HOLDER MANDREL FOR FITTING TO A ROTATING MACHINE

BACKGROUND OF THE INVENTION

The invention relates to a tool-holder mandrel for fitting to a rotating machine.

The rotating machine may notably be a drill or an electric screw driver.

DESCRIPTION OF THE PRIOR ART

A conventional mandrel comprises a body comprising a rear portion designed to be attached to a drive shaft of the rotating machine and a front portion in which housings are arranged converging toward the front. Each of the housings are used to slidingly mount a jaw comprising an outer thread. A nut, having an inner thread interacting with the outer thread of the jaws, is coupled to a sleeve forming a portion of the outer surface of the mandrel. Rotation of the sleeve by an operator rotates the nut and thus closes or opens the jaws.

Another type of mandrel, known notably from French patent FR 2 883 208 in the name of the Applicant, comprises a central part comprising a rear portion designed to be attached to a drive shaft of the rotating machine and a front portion having a peripheral thread. A body formed by a sheet-metal cage is mounted so as to pivot on the central part and has housings in which jaws are guided. Each jaw has an inner thread interacting with the peripheral thread of the central portion. The mandrel also comprises an actuation sleeve, coupled in rotation to the body, the rotation of the sleeve thus rotating the body and the jaws, the latter then moving closer to or further apart from one another.

There is a need to be able to further simplify the structure of a mandrel and reduce the dimensions of the latter.

SUMMARY OF THE INVENTION

Accordingly, the invention relates to a tool-holder mandrel for fitting to a rotating machine, comprising:
  a body comprising a rear portion designed to be attached to a drive shaft of the rotating machine and a front portion in which housings are arranged converging toward the front;
  jaws mounted so as to slide each in a housing of the body and having an inner thread;
  a ring for moving the jaws, mounted so as to pivot relative to the body, having a peripheral thread interacting with the inner thread of the jaws so that the rotation of the ring closes or opens the jaws;
which mandrel has an axis, the jaws extending along an axis that is inclined relative to the axis of the mandrel, at an angle of between 15° and 30°.

Such a mandrel has a simple and compact structure, particularly suitable for uses for which the clamping torques are not very high.

Moreover, the wide angle of the jaws makes it possible to shorten the length of the mandrel. The increase in inclination has the effect of requiring a greater clamping torque provided by the user.

Advantageously, the jaws extend along an axis that is inclined relative to the axis of the mandrel, at an angle of between 16° and 20°, preferably of the order of 17°. An angle of the order of 17° provides a good compromise between the length of the mandrel and the clamping torque to be provided.

According to a first embodiment of the invention, the mandrel comprises a sleeve forming a portion of the outer surface of the mandrel, designed to be actuated manually by a user, mounted on the ring for moving the jaws and coupled in rotation to the latter.

The user therefore actuates the sleeve which, in its turn, operates the aforementioned ring in order to move the jaws.

According to one possibility of the invention, the sleeve is coupled to the ring via a knurling element.

Preferably, the body has a peripheral groove and the ring for actuating the jaws has an inner groove placed facing the peripheral groove of the body, rolling means, for example balls, being placed in said grooves so as to form a bearing between the body and the ring.

According to one feature of the invention, at least one of said grooves is generally V-shaped.

Advantageously, the ring has an aperture for inserting rolling means, opening into its inner groove.

According to one possibility of the invention, the insertion aperture is covered by the sleeve.

In this way, when the mandrel is assembled, the actuation ring is assembled to the body, the balls are engaged through the aforementioned insertion aperture, then the sleeve is attached to the ring. The balls are therefore trapped in the grooves with no possibility of removal.

According to a second embodiment of the invention, the mandrel comprises:
  an insert supported by the ring for moving the jaws and immobilized in rotation on this ring,
  a sleeve forming a portion of the outer surface of the mandrel and designed to be actuated manually by a user, the sleeve being mounted so as to pivot relative to the body and having an inner portion which interacts with the insert in order to rotate it relative to the body, and
  radial locking means supported by the insert and able to move between an unlocked position in which the ring is capable of being rotated relative to the body and a locked position in which the locking means interact with the body so as to prevent a rotation of the ring in the direction for opening the jaws, the locking means being designed to be actuated by the sleeve.

Advantageously, the radial locking means are immobilized in rotation on the insert and the sleeve has an angular relative movement relative to the locking means and to the insert between a first position in which the locking means are in the unlocked position and the sleeve can rotate the insert, and a second position in which the locking means are in the locked position, the movements of the sleeve between its first and second positions actuating the movements of the locking means between their unlocked and locked positions.

Preferably, the locking means comprise at least one first leaf spring mounted so as to be fixed angularly on the insert and having a free end which protrudes through a recess arranged in the ring for moving the jaws and which, in the locked position of the radial locking means, interacts with peripheral gear teeth arranged on the body.

Advantageously, the locking means comprise at least one second leaf spring which has a free end furnished with a raised element which interacts respectively in the first and second positions of the sleeve with a first and a second depression arranged in the sleeve.

Preferably, the first and second leaf springs are secured to an annular element supported by the insert and immobilized in rotation on this insert by means of at least two fixing portions which penetrate matching portions arranged in the insert.

Preferably, the sleeve comprises at least one recessed portion in which the free end of the first leaf spring is housed, in the first position of the sleeve, in order to disengage this free end from the gear teeth of the body.

The sleeve preferably comprises at least two notches which interact with at least two fingers arranged on the insert, the notches being centered on the axis of the mandrel and having a length that is greater than that of the fingers of the insert, this length being considered in the direction of the arc of a circle on which these notches extend.

Advantageously, the difference in length between the fingers of the insert and the notches of the sleeve is made so that, in the first position of the sleeve, the fingers butt against one of the faces of the notches and the raised element of the second leaf spring is in the first depression, and that, in the second position of the sleeve, the fingers butt against the other of the faces of the notches and the raised element of the second leaf spring is in the second depression.

Preferably, the fixing portions of the annular element each comprise a base which extends substantially radially outward from the annular element and two bends which extend from the base transversely relative to the plane of the annular element, the bends being mounted elastically on the fingers of the insert which penetrate the notches of the sleeve.

Preferably, the mandrel comprises an annular cap attached to the front of the body. The annular cap and the body can be made in a single piece or in two separate pieces.

Preferably, the peripheral thread of the ring for moving the jaws is a righthand thread.

Preferably, each jaw has a front portion and a rear portion comprising a first part extending from the front portion and a second part extending from the first part, the face of the second part turned outward being set back from the extension of the face of the first part turned outward. Preferably, the second part of the rear portion of each jaw has a section lower than that of the corresponding first part. Advantageously, the rear portion of each jaw has, on its face turned outward, a flat extending on the axis A of the mandrel. Such a flat is preferably produced by milling.

The rear portion of each jaw preferably comprises a face turned inward having a thread designed to interact with the peripheral thread of the ring for moving the jaws.

BRIEF DESCRIPTION OF THE DRAWINGS

In any case, the invention will be clearly understood with the aid of the following description, with reference to the appended schematic drawing representing as examples two embodiments of this mandrel.

DESCRIPTION OF THE PREFERRED EMBODIMENTS

Figure 1:
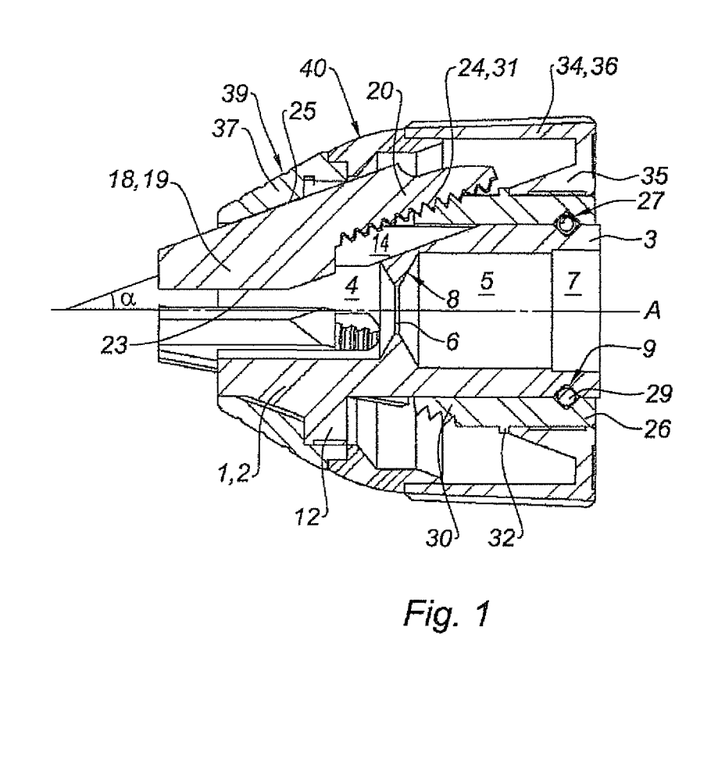
FIG. 1 is a view in longitudinal section of a mandrel according to a first embodiment.
Figure 2:
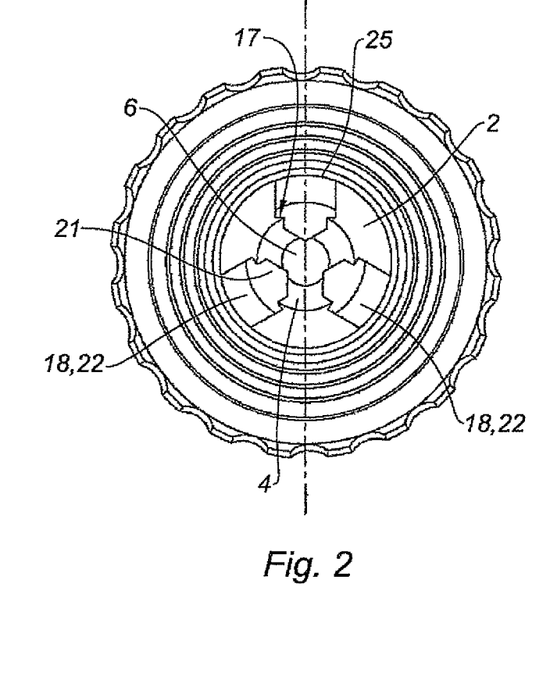
FIG. 2 is a front view of the mandrel of FIG. 1.
Figure 3:
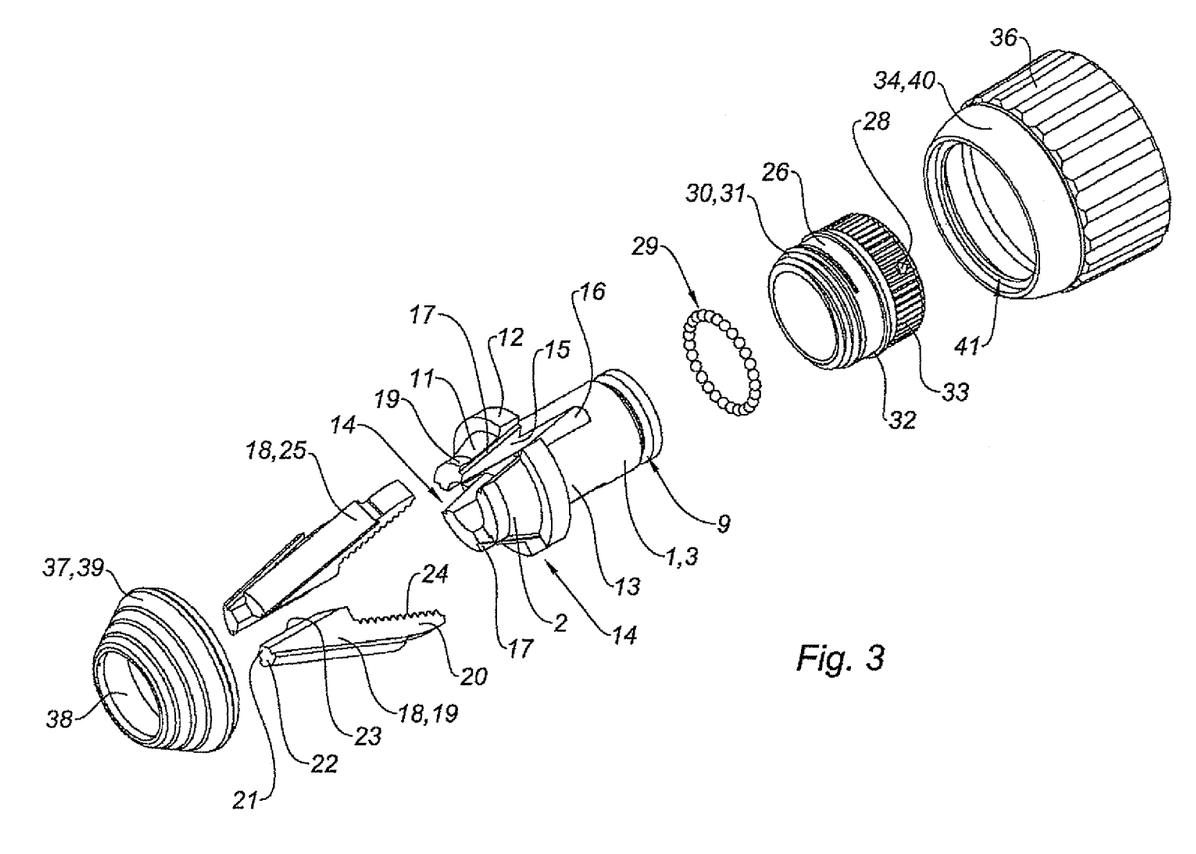
FIG. 3 is an exploded view in perspective of the mandrel of FIG. 1.
Figure 4:
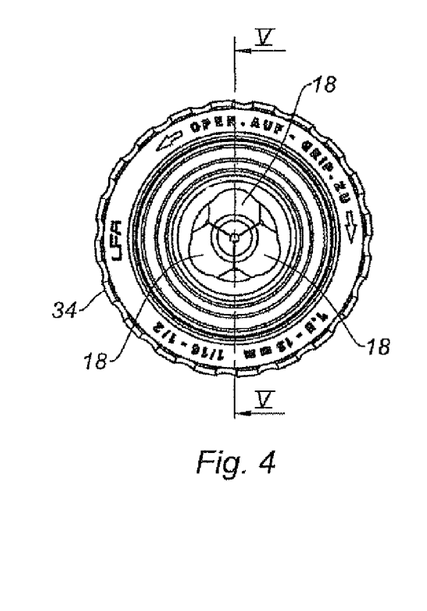
FIG. 4 is a front view of a mandrel according to a second embodiment.

As shown in FIGS. 1 to 3, a mandrel according to a first embodiment of the invention comprises a central body 1, of generally cylindrical shape and extending along an axis A.

The body 1 has a front portion 2 and a rear portion 3. The body 1 has a first axial hole 4 opening toward the front and a second axial hole 5 opening toward the rear, said holes being connected to one another via an axial aperture 6 of smaller diameter. The second axial hole 5 also has a rear end 7 of larger diameter forming a shoulder. The bottom annular walls 8 of the holes 4, 5 are generally frustoconical in shape.

The second hole 5 allows the insertion and the fastening of a drive shaft of a rotating machine, not shown.

The rear portion 3 has a V-shaped peripheral groove 9.

The front portion 2 comprises, from front to rear, a cylindrical zone 10, a generally frustoconical-shaped zone 11 and a cylindrical zone 12 of larger diameter, and then another cylindrical zone 13 of the same diameter as the rear portion 3.

The front portion 2 has three housings 14 formed by channels angularly offset from one another at an angle of 120°, so as to be evenly distributed.

Each channel has two lateral walls 15 and a bottom wall 16 inclined in the direction of the axis A, from rear to front. The lateral walls 15 are substantially perpendicular to the bottom wall 16. Said channels 14 open into the first hole 4 and form housings converging toward the front. Each lateral wall 15 of each channel 14 has, at its edge furthest from the axis, a shoulder 17 or a rim forming a bearing surface for a jaw 18, as is better described below.

A jaw 18 is mounted in each converging housing 14 of the body 1. Each jaw 18 has a generally rectangular cross section as shown in FIG. 2. Naturally, the jaws could also have a generally cylindrical cross section as known from the prior art.

Each jaw 18 has a front portion 19 and a rear portion 20. The front portion 19 has a generally T-shaped cross section comprising a branch 21 oriented radially and a base 22 the edges of which rest on the rims 17 of the corresponding housing 14.

The free end of the branch, turned toward the axis, opens into the first hole and is generally V-shaped, the apex of the V defining a line of contact 23 designed to press against a tool. The line of contact 23 extends substantially parallel to the axis A.

The rear portion 20 of each jaw forms a crank with the front portion 19. The rear portion 20 comprises a face turned inward, that is to say turned toward the axis, having a righthand thread 24. The inner face is inclined toward the axis A and toward the front, at an angle α of the order of 20° relative to the axis A and relative to the line of contact 23.

The jaws 18 also have a domed back 25, turned outward, also inclined at an angle of 20° relative to the axis A.

Because of their structure, the jaws 18 can be made by sintering, no rework operation during their manufacture then being necessary.

The mandrel also comprises a ring 26 for moving the jaws 18, mounted so as to pivot at the rear 3 of the body 1. The ring comprises a V-shaped inner groove 27 positioned to face the groove 9 of the body 2 and an aperture 28 (FIG. 3) opening into the inner groove 27. Balls 29, inserted through the aperture 28, are trapped in the V-shaped grooves 9, 27 between the ring 26 and the body 1.

The front end 30 of the ring 26 has a generally frustoconical-shaped outer wall, the angle of inclination of the outer wall being of the order of 20° relative to the axis A. The frustoconical zone 30 has a righthand thread 31 meshing with the inner thread 24 of the jaws 18.

The outer wall of the ring 26 also has an annular positioning stop 32, placed in a middle zone of the ring 26, and a knurling element 33 situated behind the positioning stop 32.

A sleeve 34 having an inner annular base 35 is attached by knurling to the ring 26 for moving the jaws. The outer face 36 of the sleeve is notched and is used for its actuation.

A cap 37 is screwed onto the cylindrical zone 12 of larger diameter of the body 1. The cap 37 has a frustoconical inner wall 38 interacting with the back 25 of each jaw 18 so as to hold the jaws in position in the bottom of the housings 14. The outer wall 39 of the cap 37 is placed in the extension of the outer wall 40 of the sleeve 34. The rear end of the cap 37 is housed in a recess 41 (FIG. 3) formed at the front end of the sleeve 34. The sleeve 34 can pivot relative to the cap 37 which is secured to the body.

The operation of the mandrel according to the first embodiment of the invention is as follows.

The drive shaft of a rotating machine is fixed into the second hole 5 of the body 1.

Suppose that the jaws 18 are in position apart from one another, that is to say do not extend totally to the inside of the first hole 4 of the body 1.

In this case, a tool, for example a screwing endpiece or a bit, can be inserted into the second hole 5. The operator then turns the sleeve 34 in the clockwise direction. The ring 26 is then also rotated in the same direction, so as to move the jaws 18 forward in the housings 14 so that the latter draw nearer to the axis A and clamp the tool.

Note that, during the movement of the jaws 18, each line of contact 23 always remains substantially parallel to the axis A.

Conversely, when the operator turns the sleeve 34 in the counterclockwise direction, the jaws 18 are then moved away from the axis A in order to release the tool.

The compact structure of the mandrel and its shortness make it particularly suitable for being fitted to rotating machines such as electric screw drivers.

FIGS. 4 to 9 represent a mandrel according to a second embodiment of the invention which differs from the first embodiment mainly in that the mandrel comprises:

an insert 42 supported by the ring 26 for moving the jaws and immobilized in rotation on this ring, radial locking means supported by the insert 42 and able to move between an unlocked position in which the ring 26 is capable of being rotated relative to the body 1 and a locked position in which the locking means interact with the body 1 so as to prevent a rotation of the ring 26 in the direction for opening the jaws, and in that the annular base 35 of the sleeve 34 is not assembled to the ring 26 for moving the jaws but interacts with the insert 42 in order to rotate it relative to the body 1.

Figure 7:
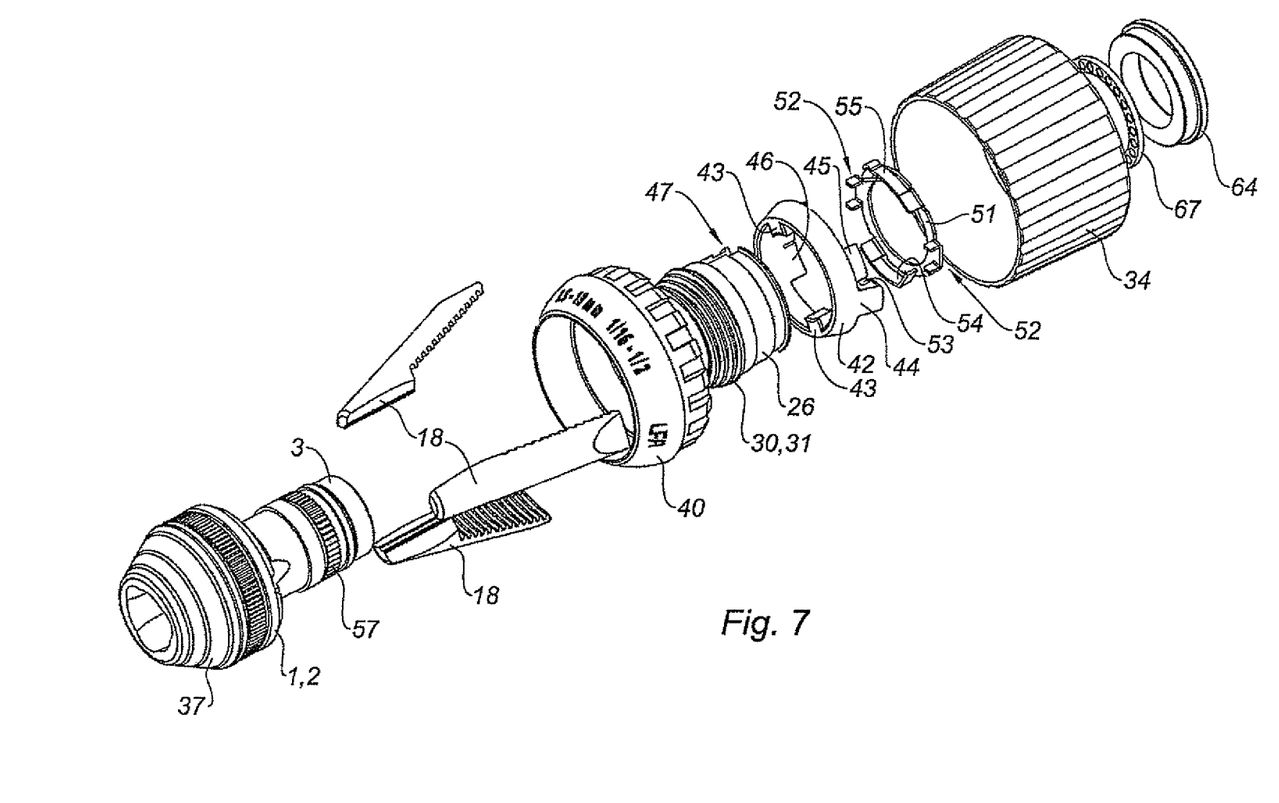
FIG. 7 is an exploded view in perspective of the mandrel of FIG. 4.

The insert 42, preferably made of synthetic material, has a generally frustoconical front portion the inner face of which comprises two diametrically opposed lugs 43 extending radially inward. The insert 42 also comprises as an extension of the front portion two diametrically opposed fingers 44 extending axially rearward, two first claws 45 extending on either side of one of the fingers 44, and two second claws 46 extending on either side of the other finger 44. The various claws 45, 46 and the two fingers 44 are of substantially identical length, this length being considered in the direction of the axis of the mandrel.

The rear end of the ring 26 comprises two diametrically opposed recesses 47 opened axially and radially in which the lugs 43 of the insert 42 are housed so as to make the insert and the ring rotate as one.

The sleeve 34 has an angular relative movement relative to the locking means and to the insert 42 between a first position (shown in FIG. 8) in which the locking means are in the unlocked position and the sleeve 34 can rotate the insert 42, and a second position (shown in FIG. 9) in which the locking means are in the locked position. It should be noted that it is the movements of the sleeve 34 between its first and second positions that actuate the movements of the locking means between their unlocked and locked positions.

Figure 8:
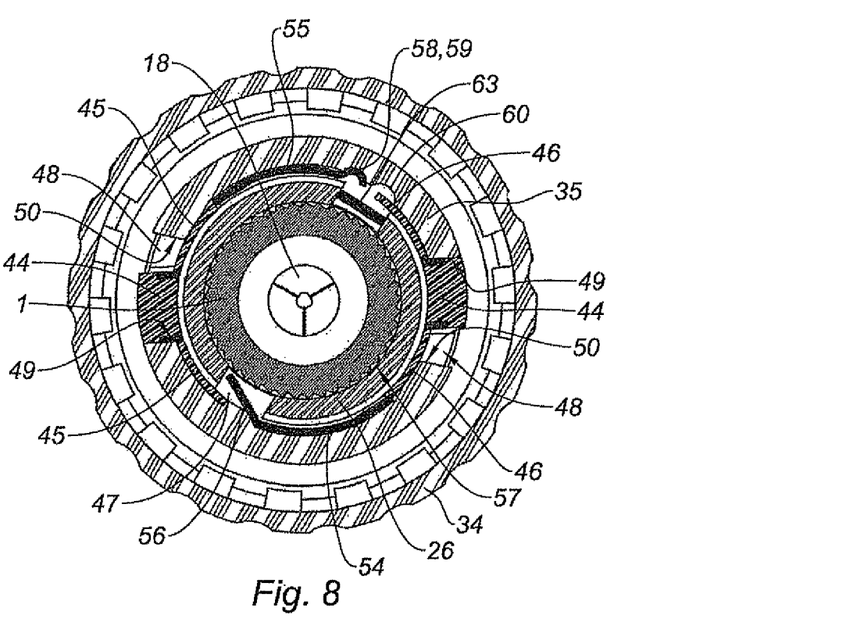
FIGS. 8 and 9 are two views in cross section of the mandrel of FIG. 4, on the line VIII-VIII of FIG. 6, respectively in the unlocked position and the locked position of this mandrel.
Figure 9:
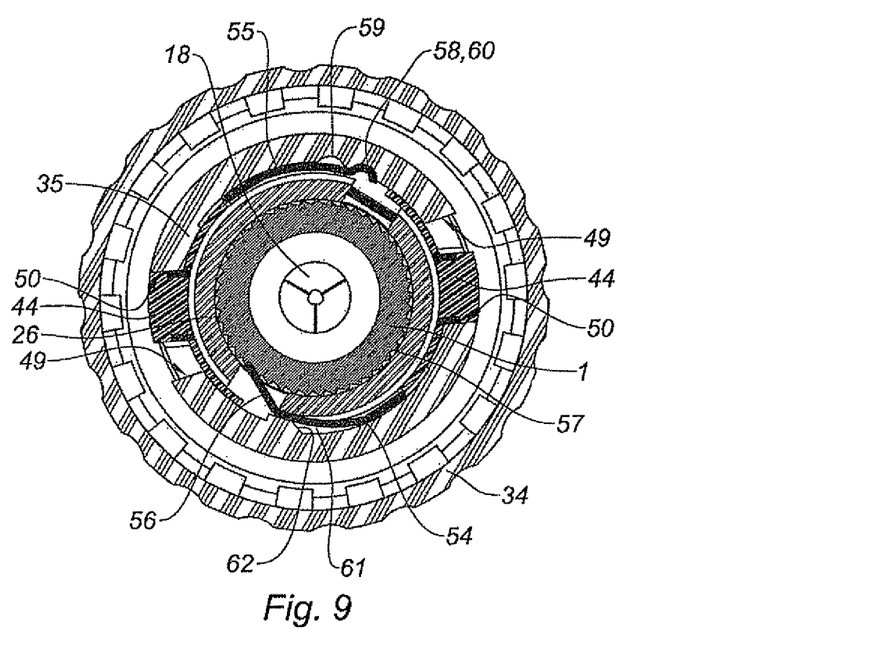

As shown more particularly in FIGS. 8 and 9, the annular base 35 of the sleeve 34 comprises two diametrically opposed notches 48 which interact with the two fingers 44 arranged on the insert 42, the notches 48 being centered on the axis A of the mandrel and having a length greater than that of the fingers 44 of the insert, this length being considered in the direction of the arc of a circle on which these notches extend. These notches 48 are each delimited laterally by two faces 49, 50 that are oriented substantially radially.

The radial locking means comprise an annular element 51 mounted on the insert 42 so as to be attached in rotation and fixed to the insert 42 by means of two diametrically opposed attachment parts 52 which penetrate matching portions arranged in the insert 42. Preferably, the annular element 51 is pressed against the rear end of the insert 42 and therefore presses against the free ends of the fingers 44 and of the claws 45, 46.

Each attachment part 52 has a base which extends radially outward from the annular element 51 and two lateral bends which extend from the base perpendicular to the plane of the annular element 51 toward the front of the annular element. The bends are engaged elastically in notches 53 arranged on the lateral faces of the fingers 44 of the insert in order to stop the annular element 51 from rotating relative to the insert 42. The bends advantageously have a shape conforming to the shape of the notches of the fingers of the insert.

The annular element 51 also comprises a first leaf spring 54 and a second leaf spring 55 shaped in an arc of a circle centered on the axis of the mandrel. The two leaf springs 54, 55 extend away from one another, toward the front of the annular element, above the rear section of the ring 26 for moving the jaws.

The first leaf spring 54 has a free end 56 that is curved in the direction of the axis of the mandrel and that protrudes through one of the recesses 47 arranged in the ring 26 for moving the jaws and which, in the locked position of the radial locking means, interacts with peripheral gear teeth 57 arranged on the rear portion 3 of the body 1, and more particularly in the zone of the latter that is covered by the ring 26 for moving the jaws. The peripheral gear teeth 57 extend coaxially with the axis A of the body 2.

The second leaf spring 55 has a free end furnished with a raised element 58 turned toward the outside of the mandrel in order to interact respectively, in the first and second positions of the sleeve, with a first depression 59 and a second depression 60 arranged in the inner wall of the annular base 35 of the sleeve 34.

Moreover, the annular base 35 of the sleeve comprises, in its inner wall, a recessed portion 61 terminating in a ramp 62 and in which the free end 56 of the first leaf spring 54 is housed, in the first position of the sleeve, in order to disengage this free end 56 from the gear teeth 57 of the body 1, as shown in FIG. 8.

The annular element 51 also comprises a claw 63 extending axially toward the front of the mandrel and engaged in the other of the recesses 47 arranged in the ring 26 for moving the jaws, as shown in FIGS. 8 and 9.

Moreover, it can be understood that the difference in length between the fingers 44 of the insert 42 and the notches 48 of the sleeve 34 is made so that, in the first position of the sleeve, the fingers 44 butt against the radial face 49 of the notches 48 and the raised element 58 of the second leaf spring 55 is housed in the first depression 59, and that, in the second position of the sleeve, the fingers 44 butt against the radial face 50 of the notches 48 and the raised element 58 of the second leaf spring 55 is housed in the second depression 60.

When the free end 56 of the first leaf spring 54 is in the position disengaged from the gear teeth 57, as shown in FIG. 8, it is possible to clamp or unclamp the tool by pivoting the sleeve 34, and consequently the insert 42 and the ring 26 for operating the jaws. Conversely, when the free end 56 of the first leaf spring 54 is engaged in the gear teeth 57, as shown in FIG. 9, pivoting of the sleeve 34 about the body 1 is made impossible solely by the action of the vibrations resulting from the operation of the machine and from the working of the tool.

Figure 5:
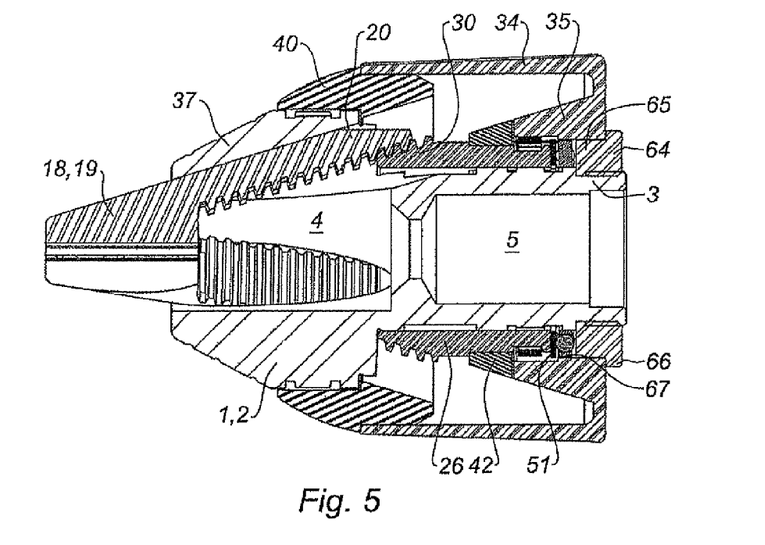
FIG. 5 is a view in longitudinal section of the mandrel of FIG. 4 on the line V-V of FIG. 4.
Figure 6:
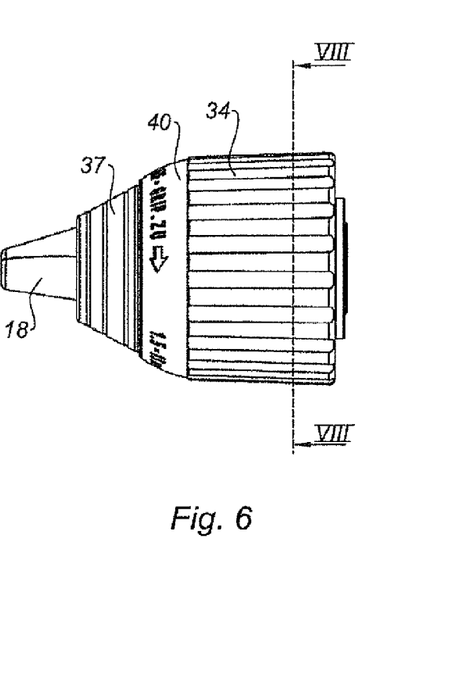
FIG. 6 is a side view of the mandrel of FIG. 4.

As is shown more particularly in FIGS. 5 and 7, the mandrel has a plug 64 comprising a cylindrical front part 65 engaged in the annular base 35 of the sleeve and a flange 66 butting against the rear face of the annular base 35 of the sleeve 34. To make it easier to rotate the ring 26 for removing the jaws on the body, an annular element 67 furnished with rolling balls is interposed between the rear face of the ring 26 for moving the jaws and the plug 64.

It should be noted that, according to the embodiment shown in FIGS. 4 to 9, the annular piece 40 is coupled to the front portion 2 of the body 1 via a knurled element and can rotate relative to the sleeve 34, and that the annular cap 37 and the body 1 are made in a single piece.

It should also be noted that the rear portion of each jaw 18 comprises a flat extending along the axis A of the mandrel.

The operation of the mandrel according to the second embodiment of the invention is as follows.

Suppose that the jaws 18 are in position separated from one another and that the sleeve 34 and the locking means are in the position shown in FIG. 8.

The operator then turns the sleeve 34 in the clockwise direction which rotates the insert 42 by means of the fingers 44 engaged in the notches 48 of the sleeve 34. The ring 26 is then also rotated in the same direction, so as to move the jaws 18 toward the front in the housings 14 so that the latter move closer to the axis A and clamp the tool.

Conversely, when the jaws 18 come into contact with the tool inserted in the mandrel, the resistance of the insert 42 against the rotation by the sleeve 34 increases. The sleeve 34 then rotates relative to the assembly made up of the insert 42, the ring 26 and the leaf springs 54, 55. This relative rotation is limited by the difference in length between the fingers 44 of the insert 42 and the notches 48 of the sleeve 34. The fingers 44 then butt against the radial faces 50 of the notches 48 while the raised element 58, supported by the second leaf spring 55, is disengaged, by a flexing effect, from the first depression 59 in order to be housed in the second depression 60. Simultaneously, the free end 56 of the first leaf spring 54 is bent toward the inside of the mandrel so that this free end interacts with the gear teeth 57 supported by the body 1. The clamping of the mandrel can then continue to the maximum torque applicable by the operator with a ratchet effect of the first leaf spring 54 on the gear teeth 57 of the body which can be heard by the operator. The interaction between the free end 56 of the first leaf spring 54 and the gear teeth 57 prevents any inappropriate unlocking by the vibrations caused during a percussion.

When the user wishes to take the tool out of the mandrel again, it is sufficient to move the sleeve 34 from its second position to its first position, that is to say in the counterclockwise direction. There is then a relative rotation of the sleeve 34 relative to the insert 42, a movement during which the raised element 58 moves toward the first depression 59 and the free end 56 of the first leaf spring 54 is disengaged from the gear teeth 57. The fingers 44 of the insert 42 again butt against the first radial face 49 of the notches 48 supported by the sleeve. Any additional rotation of the sleeve 34 in the counterclockwise direction rotates the insert 42 and the ring 26 via the fingers 44 and therefore unclamps the jaws 18.

As goes without saying, the invention is not limited solely to the embodiments of this mandrel that have been described above as examples, but, on the contrary, it covers all the variants.

The invention claimed is:

1. A tool-holder mandrel for fitting to a rotating machine, comprising:
    a body comprising a rear portion designed to be attached to a drive shaft of the rotating machine and a front portion in which housings are arranged converging toward the front;
    jaws mounted so as to slide each in a housing of the body and having an inner thread;
    a ring for moving the jaws, mounted so as to pivot relative to the body, having a peripheral thread interacting with the inner thread of the jaws so that the rotation of the ring closes or opens the jaws;
    which mandrel has an axis, the jaws extending along an axis that is inclined relative to the axis of the mandrel, at an angle of between 15° and 30°, and the mandrel further comprising:
    an insert supported by the ring for moving the jaws and immobilized in rotation on this ring,
    a sleeve forming a portion of the outer surface of the mandrel and designed to be actuated manually by a user, the sleeve being mounted so as to pivot relative to the body and having an inner portion which interacts with the insert in order to rotate it relative to the body, and
    a radial locking mechanism supported by the insert and able to move between an unlocked position in which the ring is capable of being rotated relative to the body and a locked position in which the locking mechanism interacts with the body so as to prevent a rotation of the ring in the direction for opening the jaws, the locking mechanism being designed to be actuated by the sleeve.

2. The mandrel as claimed in claim 1, wherein the jaws extend along an axis that is inclined relative to the axis of the mandrel, at an angle of between 16° and 20°.

3. The mandrel as claimed in claim 1, wherein the radial locking mechanism is immobilized in rotation on the insert and wherein the sleeve has an angular relative movement relative to the locking mechanism and to the insert between a first position in which the locking mechanism is in the unlocked position and the sleeve can rotate the insert, and a second position in which the locking mechanism is in the locked position, the movements of the sleeve between its first and second positions actuating the movements of the locking mechanism between the unlocked and locked positions.

4. The mandrel as claimed in claim 1, wherein the locking mechanism comprises at least one first leaf spring mounted so as to be fixed angularly on the insert and having a free end which protrudes through a recess arranged in the ring for moving the jaws and which, in the locked position of the radial locking mechanism, interacts with peripheral gear teeth arranged on the body.

5. The mandrel as claimed in claim 4, wherein the locking mechanism further comprises at least one second leaf spring which has a free end furnished with a raised element which interacts respectively in the first and second positions of the sleeve with a first and a second depression arranged in the sleeve.

6. The mandrel as claimed in claim 5, wherein the first and second leaf springs are secured to an annular element supported by the insert and immobilized in rotation on this insert by means of at least two fixing portions which penetrate matching portions arranged in the insert.

7. The mandrel as claimed in claim 4, wherein the sleeve comprises at least one recessed portion in which the free end of the first leaf spring is housed, in the first position of the sleeve, in order to disengage this free end from the gear teeth of the body.

8. The mandrel as claimed in claim 4, wherein the sleeve comprises at least two notches which interact with at least two fingers arranged on the insert, the notches being centered on the axis of the mandrel and having a length that is greater than that of the fingers of the insert, this length being considered in the direction of the arc of a circle on which these notches extend.

9. The mandrel as claimed in claim 8, wherein the difference in length between the fingers of the insert and the notches of the sleeve is made so that, in the first position of the sleeve, the fingers butt against one of the faces of the notches and the raised element of the second leaf spring is in the first depression, and that, in the second position of the sleeve, the fingers butt against the other of the faces of the notches and the raised element of the second leaf spring is in the second depression.

10. The mandrel as claimed in claim 6, wherein the sleeve comprises at least two notches which interact with at least two fingers arranged on the insert, the notches being centered on the axis of the mandrel and having a length that is greater than that of the fingers of the insert, this length being considered in the direction of the arc of a circle on which these notches extend and wherein the fixing portions of the annular element each comprise a base which extends substantially radially outward from the annular element and two bends which extend from the base transversely relative to the plane of the annular element, the bends being mounted elastically on the fingers of the insert which penetrate the notches of the sleeve.

\* \* \* \* \*